(12) United States Patent
Bernet et al.

(10) Patent No.: US 6,219,265 B1
(45) Date of Patent: Apr. 17, 2001

(54) THREE-POINT CONVERTER AND METHOD FOR ITS OPERATION

(75) Inventors: Steffen Bernet, Bammental; Thomas Brückner, Heidenau, both of (DE); Peter Steimer, Unterehrendingen (CH)

(73) Assignee: ABB Research LTD, Zurich (CH)

( * ) Notice: Subject to any disclaimer, the term of this patent is extended or adjusted under 35 U.S.C. 154(b) by 0 days.

(21) Appl. No.: 09/347,104

(22) Filed: Jul. 2, 1999

(30) Foreign Application Priority Data

Jul. 2, 1998 (DE) .............................................. 198 29 856

(51) Int. Cl.[7] .................................................. H02M 7/521

(52) U.S. Cl. .......................................................... 363/137

(58) Field of Search ................................. 363/27, 28, 52, 363/58, 125, 128, 98, 56, 131, 132, 136, 137, 139, 97

(56) References Cited

U.S. PATENT DOCUMENTS 5,400,242   3/1995   Ando et al. .
5,910,892 * 6/1999   Lyons et al. ............................ 363/98

FOREIGN PATENT DOCUMENTS 0 476 463 A2   3/1992   (EP) .
0 642 212 A1   3/1995   (EP) .

OTHER PUBLICATIONS

Jae–Hyeong Suh et al.: "A New Snubber Circuit for High Efficiency and Overvoltage Limitation in Three–Level GTO Inverters", IEEE transactions on Industrial Electronics, Feb. 1997, vol. 44, No. 1, pp. 145–156.

* cited by examiner

*Primary Examiner*—Peter S. Wong
*Assistant Examiner*—Gary L. Laxton
(74) *Attorney, Agent, or Firm*—Herbert L. Lerner; Laurence A. Greenberg; Werner H. Stemer

(57) ABSTRACT

A three-point converter with NPC diodes disposed between bridge halves and a center tap of an intermediate circuit is proposed. A decoupling network is provided for the upper bridge half, a first input of which decoupling network is connected to a positive pole of the intermediate circuit and a first output of the decoupling network is connected to a positive pole of the three-point converter. Furthermore, provision is made of a further decoupling network for the lower bridge half, a first input of the further decoupling network is connected to a negative pole of the intermediate circuit and a first output of the further decoupling network is connected to a negative pole of the three-point converter. The remaining inputs of both of the decoupling networks are connected to the center tap of the intermediate circuit. The remaining outputs of both of the decoupling networks are connected via the NPC diodes to the upper and lower bridge halves. A commutation voltage for the main switches of the upper and lower bridge halves is decoupled from a halved intermediate circuit voltage ($V_{dc}/2$) independently of one another by the decoupling networks.

5 Claims, 15 Drawing Sheets

$V_{K2}$ $I_{LR2}$ $I_{D16}$ $I_{D14}$ $I_{D15}$   $I_{T12}$ $V_{K1}$ $I_{LR1}$ $I_{D11}$ $I_{D15}$ $I_{T11}$ $V_{K1}$ $V_{K2}$ $I_{LR1}$ $I_{LR2}$ $I_{LR1}$
$I_{LR2}$ $I_{D11}$ $I_{D14}$ $I_{T11}$ $I_{T12}$ t

THREE-POINT CONVERTER AND METHOD FOR ITS OPERATION

BACKGROUND OF THE INVENTION

Field of the Invention

The invention relates to a three-point converter and to a method of operating the three-point converter.

The invention is associated with the field of three-point converters that are fed by voltage intermediate circuits. Converters of this type are used both in electrical drives and in filter and compensation installations involving high power levels. The protective circuit proposed is, in particular, a possibility for the realization of high-power converters in the medium-voltage range.

A topology of a neutral point clamped (NPC) three-point converter has already been generally known for a long time. It is also used industrially in the field of high power levels. IGBTs, GTO thyristors or integrated gate commutated thyristors (IGCT) are used as main switches in this case.

When GTO thyristors are used, it is necessary to limit the rate of current rise di/dt during turn-on and also the rate of voltage rise du/dt during turn-off across the switches.

When IGCTs are used, it is necessary to limit only the rate of current rise di/dt. For this purpose, switching load-relief networks, so-called snubbers, are disposed in the circuit; they ensure the abovementioned limitation and thereby generally reduce switching losses in the switches.

A number of examples of such configurations are described in Suh, J.-H. et al.: "A New Snubber Circuit for High Efficiency and Overvoltage Limitation in Three Level GTO Inverters", IEEE Trans., On Industrial Electronics, Vol. 44, No. 2, April 1997. The limiting of the rates of voltage and current rise is achieved, in principle, by capacitors connected in parallel with the switches and, respectively, inductors connected in series as well as additional active and/or passive components which are always necessary. When GTO thyristors are used, the protective circuits must generally be implemented separately for each GTO or for each phase. The outlay on active and passive components is therefore high. Both in the case of conventional RCD snubbers and in the case of the improved variant proposed, the entire energy stored in the snubber is converted into heat via resistors. Problems which arise when conventional RCD snubbers are used, such as overvoltages across the GTO thyristors (caused by the series inductors) and unequal blocking voltage distribution between the GTOs, can only be minimized, but not solved, even with the improved snubber mentioned above.

An example of an industrially manufactured snubber is described in Komulainen, R.: "Inverter Protected in Respect of the Rates of Increase of Current and Voltage", U.S. Pat. No. 4,566,051, published on Jan. 21, 1986. In this circuit, the entire energy (snubber energy) stored in the load-relief inductors and load-relief capacitors is fed back into the DC voltage intermediate circuit. However, this requires a high outlay on circuitry.

A further disadvantage of all known switching load-relief networks for three-point converters is that the switching losses due to the high commutation voltage (half the intermediate circuit voltage in the three-point converter) can be reduced only to a limited extent and with a high outlay on components.

For the topology of two-point converters, in addition to the diverse snubber circuits which are likewise used, principles are also known in which low-loss switching is achieved by a commutation voltage of almost zero. For this purpose, an electrical network for temporarily decoupling the commutation voltage from the intermediate circuit voltage during the switching operations is incorporated between the intermediate circuit capacitor and the bridge paths of the converter, as described e.g. in Salama, S, Tadros, Y.: "Quasi Resonant 3-Phase IGBT Inverter", IEEE-PESC Conference Records, 1995. In this case, the commutation voltage can oscillate almost to zero by a resonant operation.

To summarize, it may be ascertained that the snubber circuits used to date in conventional NPC three-point converters ensure only a limited reduction of switching losses in the main switches on account of the functional principle of the snubber circuits. In many snubbers, the snubber energy is not fed back into the DC voltage intermediate circuit but rather is converted into a heat loss in the switches and the protective circuit. Furthermore, the outlay on components and the costs of conventional snubbers are considerable.

SUMMARY OF THE INVENTION

It is accordingly an object of the invention to provide a three-point converter and a method for its operation which overcomes the above-mentioned disadvantages of the prior art methods and devices of this general type, which realizes very low-loss switching of the main switches in the three-point converter.

With the foregoing and other objects in view there is provided, in accordance with the invention, a three-point converter, including:

a main positive pole and a main negative pole; an upper bridge half having main switches and a lower bridge half having main switches;

an immediate circuit having a center tap, a positive pole, a negative pole, and an intermediate circuit voltage;

upper neutral point clamped diodes (NPC diodes) disposed between and connecting the upper bridge half to the center tap and lower NPC diodes disposed between and connecting the lower bridge half to the center tap;

a first decoupling network connected to the upper bridge half and having inputs and outputs, one of the inputs of the first decoupling network is connected to the positive pole of the intermediate circuit and one of the outputs of the first decoupling network is connected to the main positive pole, remaining inputs of the inputs of the first decoupling network are connected to the center tap, remaining outputs of the outputs of the first decoupling network are connected via the upper NPC diodes to the upper bridge half;

a second decoupling network is connected to the lower bridge half and has inputs and outputs, one of the inputs of the second decoupling network is connected to the negative pole of the intermediate circuit and one of the outputs of the second decoupling network is connected to the main negative pole, remaining inputs of the inputs of the second decoupling network are connected to the center tap, remaining outputs of the outputs of the second decoupling network are connected via the lower NPC diodes to the lower upper bridge half; and a commutation voltage for the main switches of the upper bridge half and the main switches of the lower bridge half are decoupled from a halved intermediate circuit voltage independently of one another by the first decoupling network and the second decoupling network.

The particular advantages that can be obtained by the invention are that the abovementioned disadvantages, for example generation of heat loss, high outlay on components, and high costs of the snubbers for three-point converters are avoided. The invention includes the use of the decoupling of the commutation voltage from the intermediate circuit voltage by two separate protective circuits in the form of the decoupling networks for the upper and lower bridge halves in the three-point converter in a separate manner. The two decoupling networks operate completely independently of one another. They ensure a commutation voltage of almost zero for their respective bridge half, while half the intermediate circuit voltage is present at the other bridge half. Overall, the circuit has a moderate outlay on active and passive components. The limiting of the rate of current rise di/dt and the rate of voltage rise du/dt is reliably ensured. In addition, the circuit affords protection for the case where the main switches are short-circuited, by limiting the rate of rise of the short-circuit current.

As already noted, independent commutation in the upper bridge half and in the lower bridge half is possible. This also advantageously permits direct commutations from the upper to the lower bridge half "positive voltage to negative voltage" and back.

Other features which are considered as characteristic for the invention are set forth in the appended claims.

Although the invention is illustrated and described herein as embodied in a three-point converter and a method for its operation, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
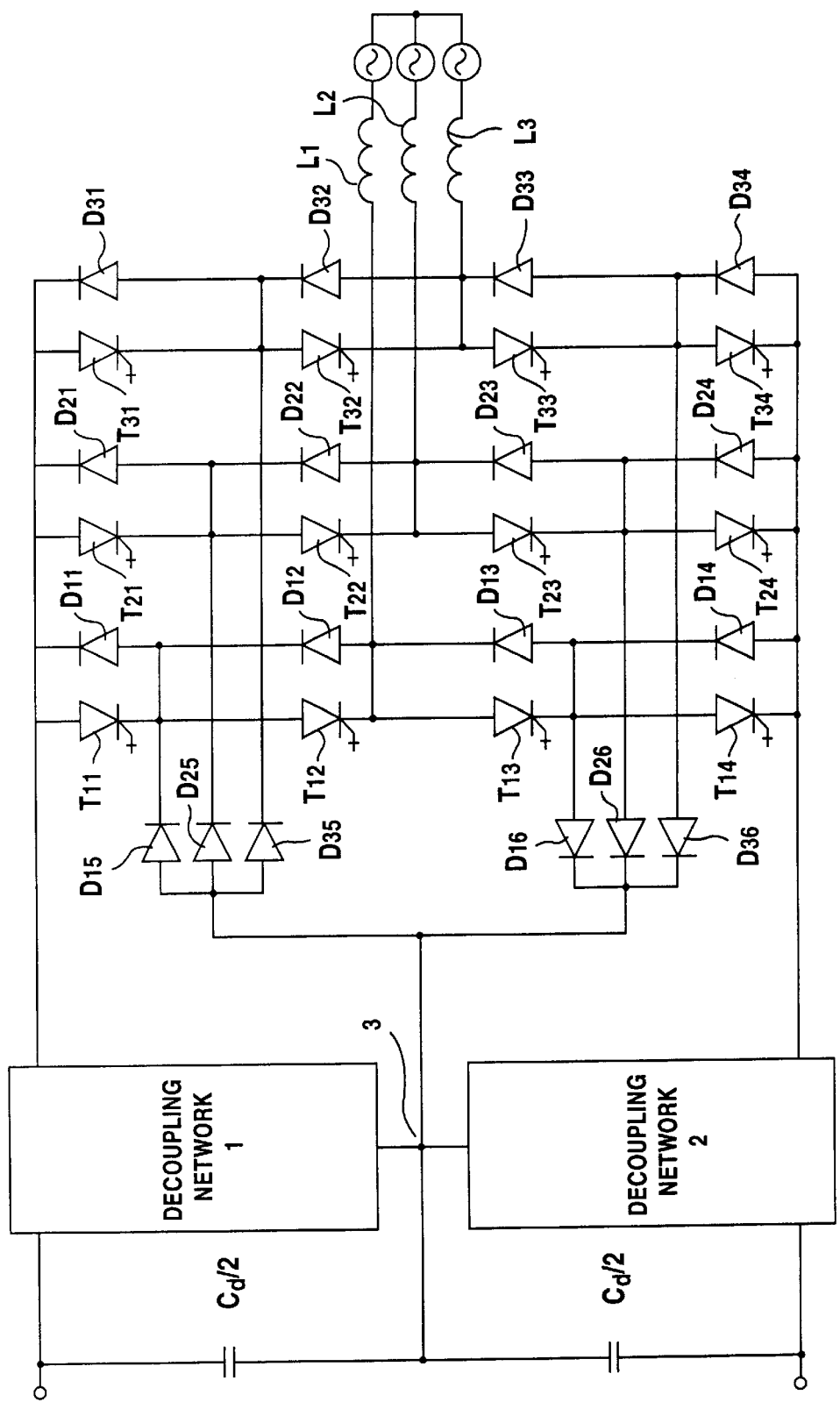
FIG. 1 is a diagrammatic, circuit diagram of a three-phase circuit of a three-point converter.

In all the figures of the drawing, sub-features and integral parts that correspond to one another bear the same reference symbol in each case. Referring now to the figures of the drawing in detail and first, particularly, to FIG. 1 thereof, there is shown a three-phase basic circuit diagram of the three-point converter. A three-phase bridge circuit contains main switches $T_{11}$, $T_{12}$ and inverse diodes $D_{11}$, $D_{12}$ (inverse diodes=reverse-connected parallel diodes) of an upper bridge half of a first phase, main switches $T_{13}$, $T_{14}$ and inverse diodes $D_{13}$, $D_{14}$ of a lower bridge half of the first phase, main switches $T_{21}$, $T_{22}$ and inverse diodes $D_{21}$, $D_{22}$ of the upper bridge half of a second phase, main switches $T_{23}$, $T_{24}$ and inverse diodes $D_{23}$, $D_{24}$ of the lower bridge half of the second phase, main switches $T_{31}$, $T_{32}$ and inverse diodes $D_{31}$, $D_{32}$ of the upper bridge half of a third phase and also main switches $T_{33}$, $T_{34}$ and inverse diodes $D_{33}$, $D_{34}$ of the lower bridge half of the third phase. The main switch and inverse diode circuits are connected to loads on an output side, the load inductors are designated by $L_1$, $L_2$, $L_3$.

On an input side, the three-phase bridge circuit is connected to a decoupling network 1 of the upper bridge half and a decoupling network 2 of the lower bridge half. The decoupling network 1 is connected to a positive pole of an intermediate circuit and to a center tap 3 of the intermediate circuit. The decoupling network 2 is connected to a negative pole of the intermediate circuit and to the center tap 3.

The upper bridge half of the first phase is connected via a neutral point clamped (NPC) diode $D_{15}$ (NPC diode=diode of the center tap) to the center tap 3 of two intermediate circuit capacitors $C_d/2$ connected in series on the input side. The lower bridge half of the first phase is connected via an NPC diode $D_{16}$ to the center tap 3. The upper bridge half of the second phase is connected via an NPC diode $D_{25}$ to the center tap 3 of two intermediate circuit capacitors $C_d/2$ connected in series on the input side. The lower bridge half of the second phase is connected via an NPC diode $D_{26}$ to the center tap 3. The upper bridge half of the third phase is connected via an NPC diode $D_{35}$ to the center tap 3 of two intermediate circuit capacitors $C_d/2$ connected in series on the input side. The lower bridge half of the third phase is connected via an NPC diode $D_{36}$ to the center tap 3.

Figure 2:
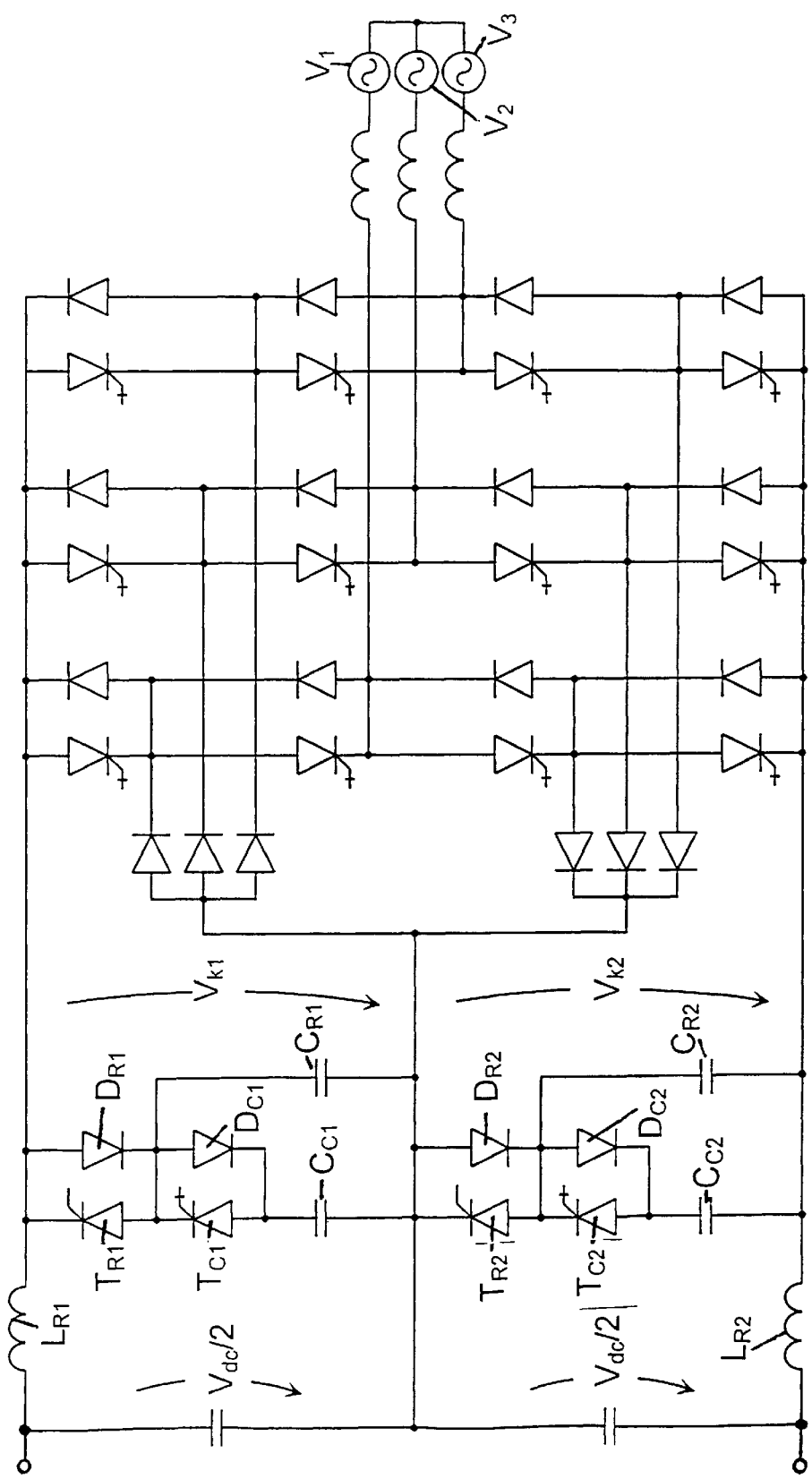
FIG. 2 is a circuit diagram of decoupling networks.

A basic circuit diagram with the construction of the decoupling networks 1, 2 is illustrated in FIG. 2. The decoupling network 1 has a resonant inductor $L_{R1}$ connected to a positive pole of the intermediate circuit. A switch $T_{R1}$ and an inverse diode $D_{R1}$ are connected to a junction point of the inductor $L_{R1}$ and the upper bridge half. The further terminals of the two constructional components are connected to a switch $T_{C1}$, an inverse diode $D_{C1}$ and, via a resonant capacitor $C_{R1}$, to the center tap 3. Further terminals of the switch $T_{C1}$ and the inverse diode $D_{C1}$ are connected via a charging capacitor $C_{C1}$ to the center tap 3.

The decoupling network 2 has a resonant inductor $L_{R2}$ connected to a negative pole of the intermediate circuit. A charging capacitor $C_{C2}$ and a resonant capacitor $C_{R2}$ are connected to the junction point of the inductor $L_{R2}$ and the lower bridge half. A further terminal of the charging capacitor $C_{C2}$ is connected to a switch $T_{C2}$ and an inverse diode $D_{C2}$. Further terminals of the switch $T_{C2}$ and the inverse diode $D_{C2}$ are connected to the further terminal of the resonant capacitor $C_{R2}$ and also to a switch $T_{R2}$ and an inverse diode $D_{R2}$. At their other ends, the switch $T_{R2}$ and the inverse diode $D_{R2}$ are connected to the center tap 3.

The halved intermediate circuit voltages across the intermediate circuit capacitors $C_d/2$ are designated by $V_{dc}/2$, the voltages across the decoupling networks 1 and 2 are designated by $V_{k1}$ and $V_{k2}$, respectively, and the voltages across the load are designated by $V_1$, $V_2$, $V_3$.

The functioning of the decoupling of the commutation voltage from the intermediate circuit voltage by two separate protective circuits in the form of the three-pole decoupling networks 1 and 2 for the upper and lower bridge halves in the three-point converter is explained in detail below using the example of the circuit in FIG. 2. The additional passive elements of the two circuits are the large charging capacitors $C_{C1}$ and $C_{C2}$, whose voltages are kept virtually constant at a value of $1.2*V_{dc}/2$, and also the resonant inductors $L_{R1}$ and $L_{R2}$ and the resonant capacitors $C_{R1}$ and $C_{R2}$, which are charged to the voltages of the charging capacitors $C_{C1}$ and $C_{C2}$, respectively, in the quiescent state. In contrast to the circuit described in Salama, S, Tadros, Y.: Quasi Resonant 3-Phase IGBT Inverter, IEEE-PESC Conference Records, 1995, the commutation is always effected via an NPC diode. The circuits are controlled in such a way that during commutations from the upper bridge half to the center tap and back "positive voltage+←→zero voltage 0", the upper decoupling network 1 is used, and for commutations from the center tap to the lower bridge half and back "zero voltage 0←→negative voltage −", the lower decoupling network 2 is used.

Since the commutation operations in the upper and lower bridge halves are decoupled, it is possible for simultaneous commutation operations to take place in different phases of the converter. This also permits common commutations in the upper and lower bridge halves in a phase "positive voltage +←→negative voltage −".

Figure 3:
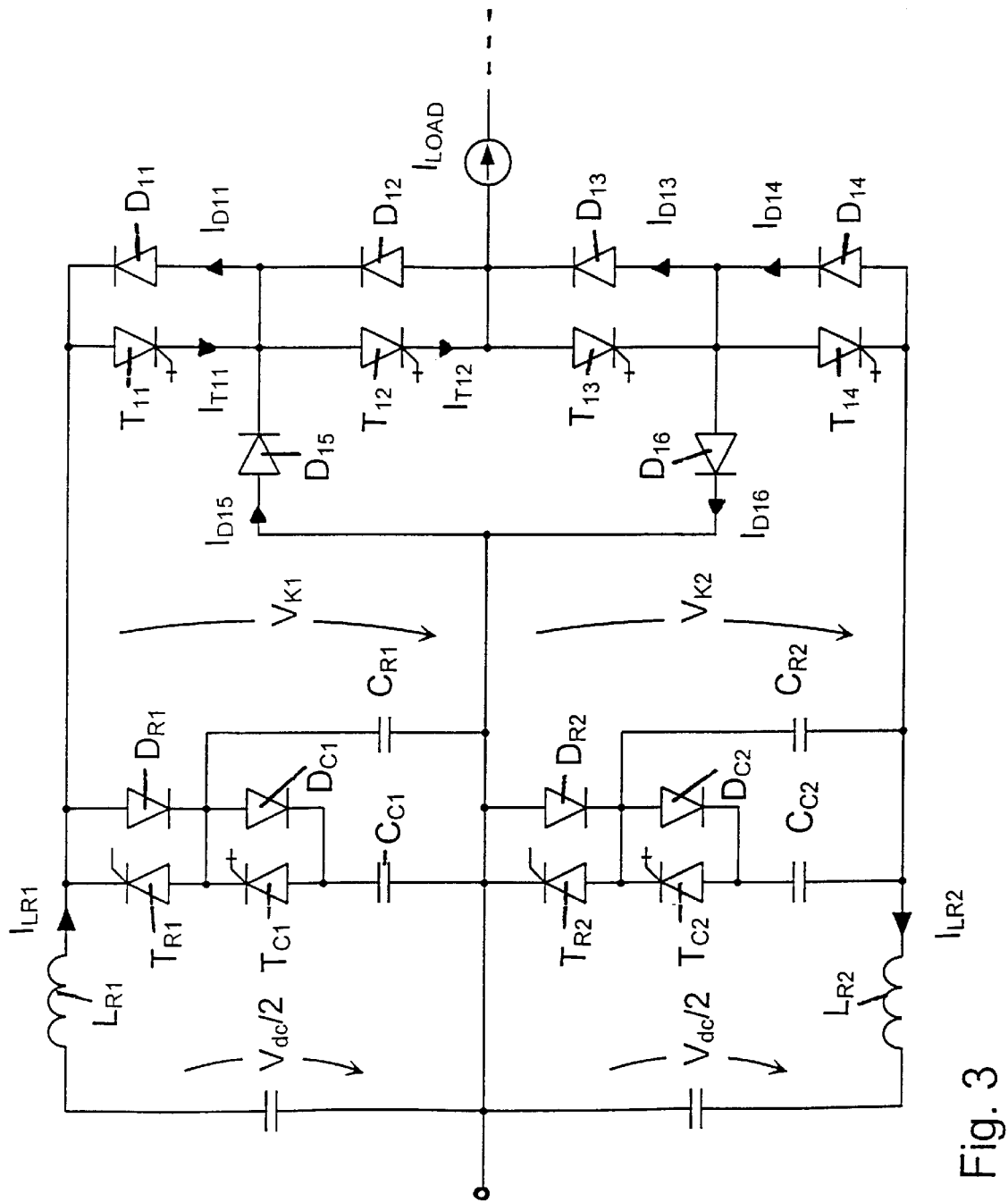
FIG. 3 is a circuit diagram of a single-phase circuit for elucidating commutations.

The single-phase circuit in FIG. 3 is used to explain the commutations. In this case, a current $I_{LR1}$ through $L_{R1}$, a current $I_{LR2}$ through $L_{R2}$, a current $I_{T11}$ through $T_{11}$, a current $I_{T12}$ through $T_{12}$, a current $I_{D11}$ through $D_{11}$, a current $I_{D13}$ through $D_{13}$, a current $I_{D14}$ through $D_{14}$, a current $I_{D15}$ through $D_{15}$, a current $I_{D16}$ through $D_{16}$ and a load current $I_{LOAD}$ are each specified. Eight different elementary commutations exist, to be precise four in the case of a positive load current $I_{LOAD}$ (a) from $T_{11}$ to $D_{15}$, (b) from $T_{12}$ and $D_{15}$ to $D_{13}$ and $D_{14}$, (c) from $D_{13}$ and $D_{14}$ to $T_{12}$ and $D_{15}$, and (d) from $D_{15}$ to $T_{11}$, and also four in the case of a negative load current $I_{LOAD}$ (e) from $D_{11}$ and $D_{12}$ to $T_{13}$ and $D_{16}$, (f) from $D_{16}$ to $T_{14}$, (g) from $T_{14}$ to $D_{16}$, and (h) from $T_{13}$ and $D_{16}$ to $D_{11}$ and $D_{12}$.

Figure 4A:
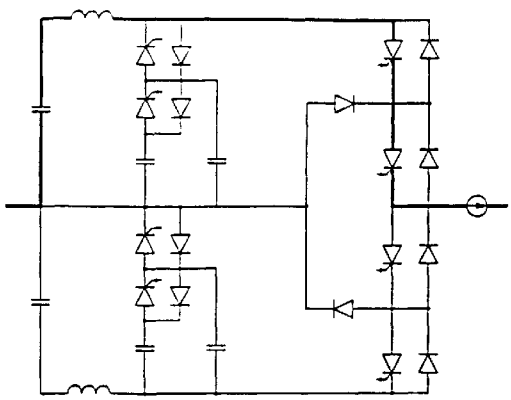
FIGS. 4a–k are circuit diagrams of the commutation from $T_{11}$ to $D_{15}$.
Figure 4B:
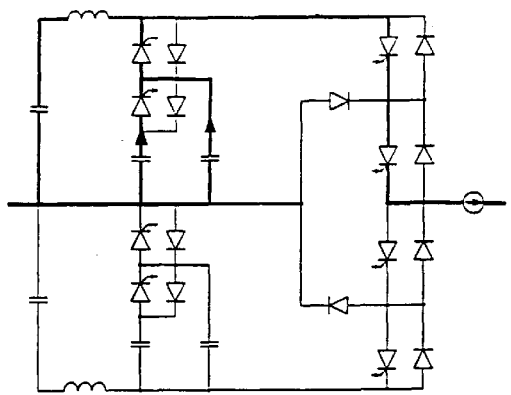
Figure 4C:
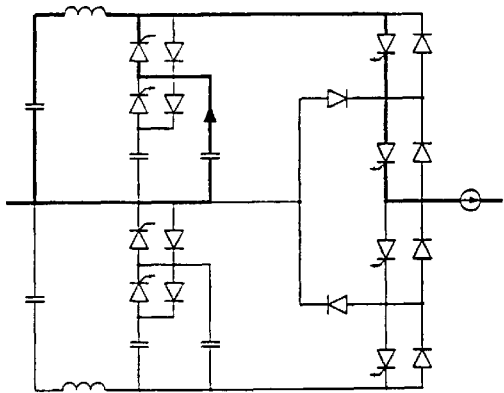
Figure 4D:
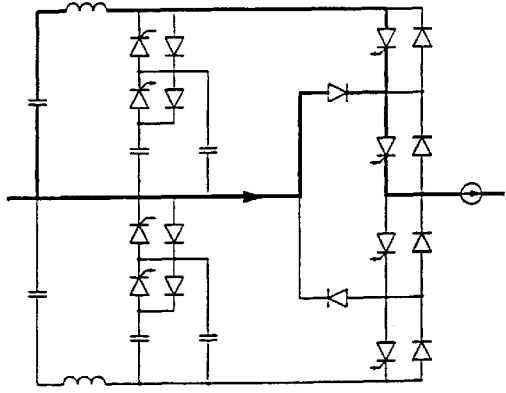
Figure 4E:
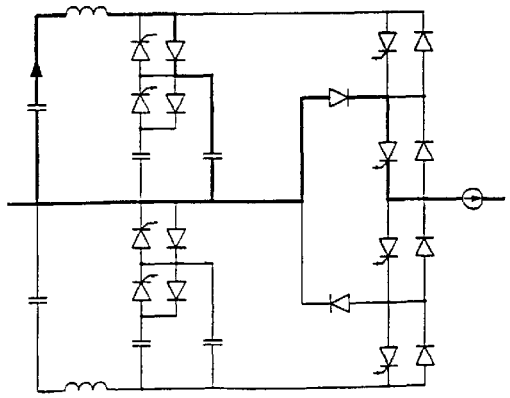
Figure 4F:
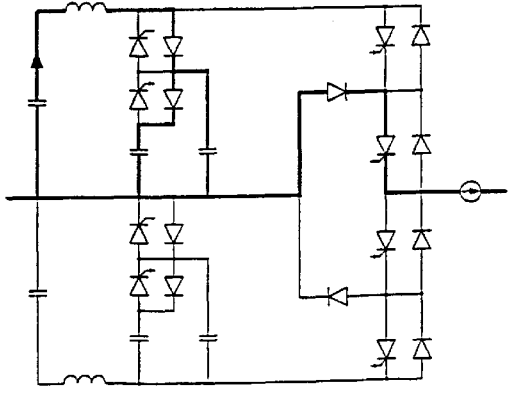
Figure 4G:
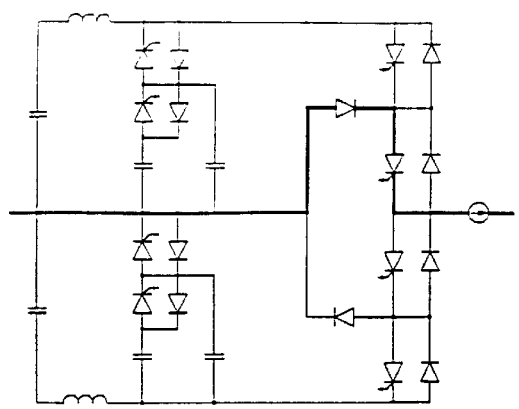
Figure 4H:
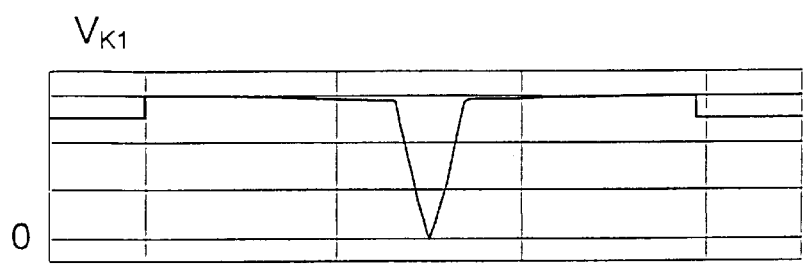
Figure 4I:
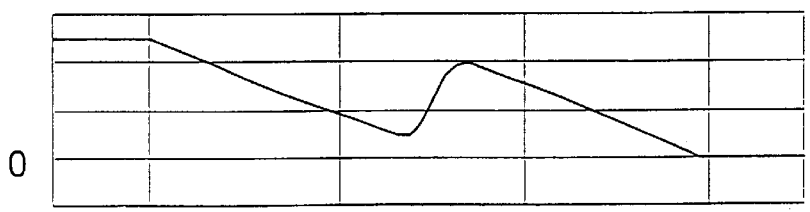
Figure 4J:
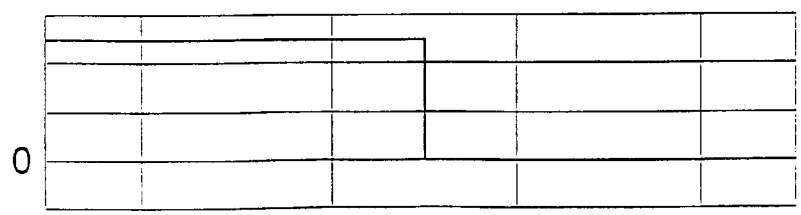
Figure 4K:
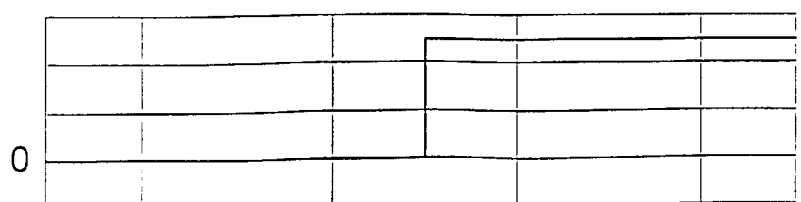

Commutation (e) is analogous to commutation (c), likewise (f) to (d), (g) to (a) and (h) to (b). For this reason, only the commutation operations (a) to (d) need be explained. The following description assumes a large load current. In the case of small load currents, there is a change in some instances in the conduction intervals between main switches and reverse-connected parallel diodes (inverse diodes) and/or the diodes of the center tap (NPC diodes). The commutation principle remains unaffected by this. The decoupling network 1 of the upper bridge half is used for the commutation operation (a). The commutation sequence and essential current and voltage profiles are illustrated in FIGS. 4a–k.
In detail, the following is applicable:

FIG. 4a: Before the commutation,

FIG. 4b: Charging of the resonant inductor $L_{R1}$,

FIG. 4c: Resonant discharge process of $C_{R1}$,

FIG. 4d: Linear reduction of the resonant current via the NPC diode before the turn-off of $T_{11}$, FIG. 4e: Resonant charging process of $C_{R1}$, FIG. 4f: Discharge of the resonant inductor $L_{R1}$, FIG. 4g: After commutation has concluded, FIG. 4h: Voltage profile of $V_{k1}$, FIG. 4i: Current profile of $I_{LR1}$, FIG. 4j: Current profile of $I_{T11}$, and FIG. 4k: Current profile of $I_{D15}$.

The commutation is started by the switches $T_{C1}$ and $T_{R1}$ being turned on and $L_{R1}$ thereupon being charged virtually linearly by $C_{C1}$. After the turn-off of $T_{C1}$, an oscillation process between $L_{R1}$ and $C_{R1}$ begins. After the voltage across $C_{R1}$ has reached zero, the resonant current commutates from $C_{R1}$ and $T_{R1}$ to $D_{15}$ and $T_{11}$. The commutation voltage is now zero and $T_{11}$ can be turned off in a low-loss manner. The load current commutates virtually instantaneously, i.e. limited only by parasitic inductances in the switch and the diode, from $T_{11}$ to the diode $D_{15}$, and also the current $I_{LR1}$ to $D_{R1}$ and $C_{R1}$. The rate of voltage rise across $T_{11}$ is consequently limited by $C_{R1}$. In the subsequent ring-back process, the capacitor $C_{R1}$ is charged to the voltage of $C_{C1}$ and, finally, the current in $L_{R1}$ is reduced down to zero by $C_{C1}$. The commutation operation is thus ended.

Figure 5A:
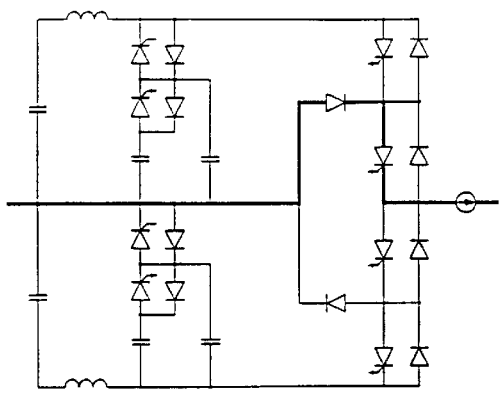
FIGS. 5a–k are circuit diagrams of the commutation from $D_{15}$ and $T_{12}$ to $D_{14}$ and $D_{13}$.
Figure 5B:
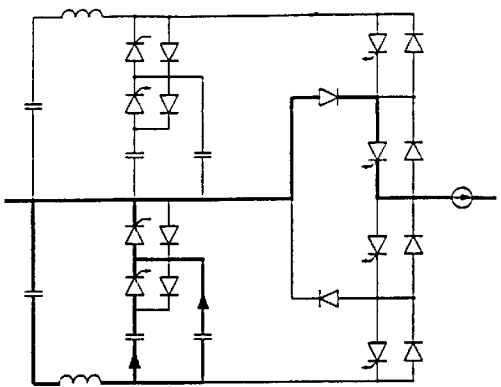
Figure 5C:
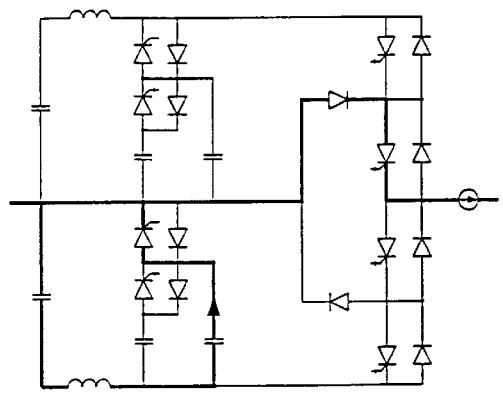
Figure 5D:
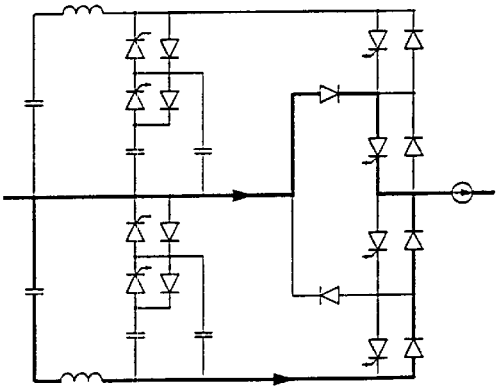
Figure 5E:
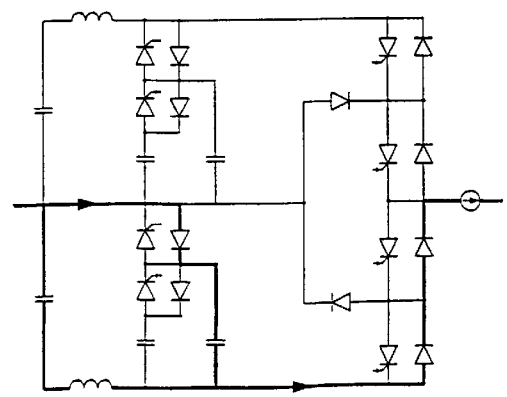
Figure 5F:
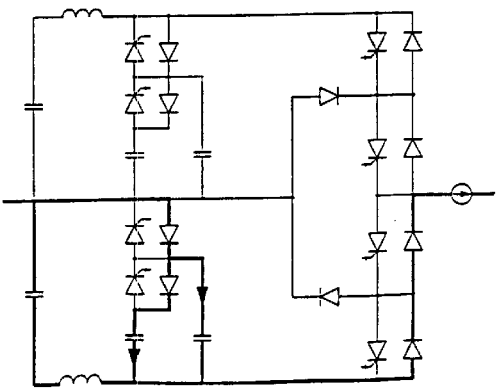
Figure 5G:
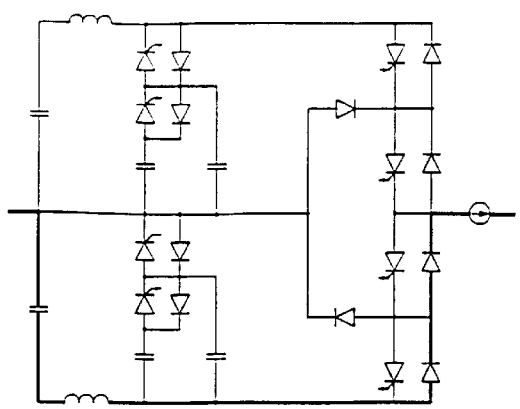
Figure 5H:
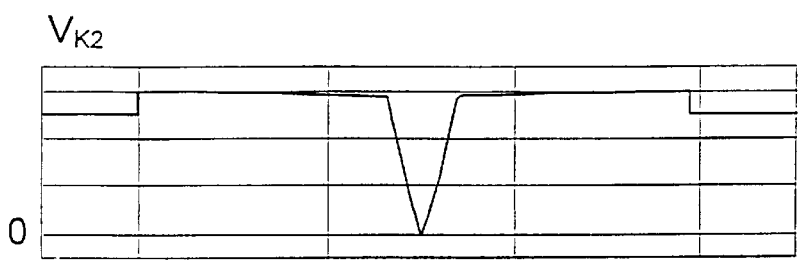
Figure 5I:
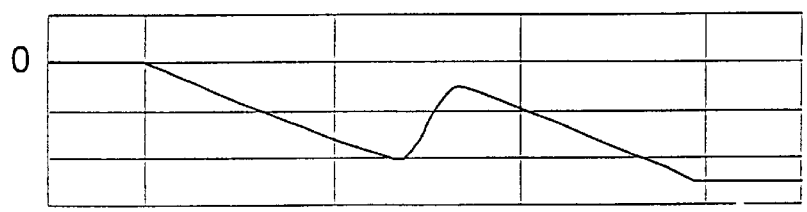
Figure 5J:
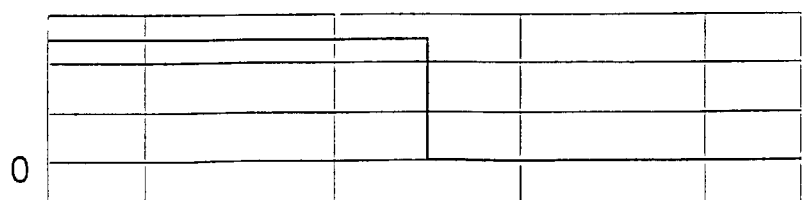
Figure 5K:
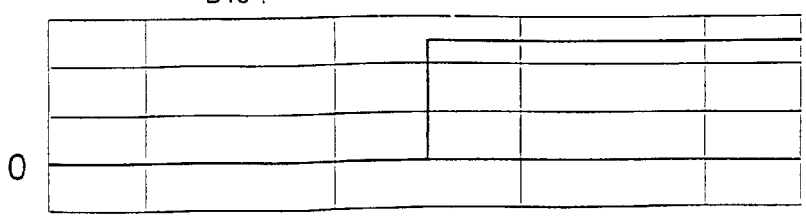

Commutation (b) is carried out with the aid of the decoupling network 2 of the lower bridge half. The commutation sequence and essential current and voltage profiles are illustrated in FIGS. 5a–k. In detail, the following are applicable:

FIG. 5a: Before the commutation,

FIG. 5b: Charging of the resonant inductor $L_{R2}$,

FIG. 5c: Resonant discharge process of $C_{R2}$,

FIG. 5d: Linear reduction of the resonant current via the NPC diode before the turn-off of $T_{12}$, FIG. 5e: Resonant charging process of $C_{R2}$, FIG. 5f: Discharge of the resonant inductor $L_{R2}$, FIG. 5g: After commutation has concluded, FIG. 5h: Voltage profile of $V_{k2}$, FIG. 5i: Current profile of $I_{LR2}$, FIG. 5j: Current profile of $I_{T12}$ and $I_{D15}$, and FIG. 5k: Current profile of $I_{D14}$ and $I_{D13}$.

After the turn-on of $T_{C2}$ and $T_{R2}$, a current is built up virtually linearly through $L_{R2}$, on account of which current, after the turn-off of $T_{C2}$, the voltage across $C_{R2}$ oscillates towards zero in a resonant process with $L_{R2}$. Once the voltage across $C_{R2}$ has become zero, the resonant current commutates from $C_{R2}$ and $T_{R2}$ to the path $D_{14}$, $D_{13}$, $T_{12}$ and $D_{15}$. $T_{12}$ can now be turned off in a low-loss manner. The load current commutates virtually instantaneously to $D_{14}$ and $D_{13}$. The difference formed from the load current and the resonant current in $L_{R2}$ immediately before the turn-off of $T_{12}$ commutates at the same instant to $D_{R2}$ and $C_{R2}$ and thus forms the initial condition for the subsequent ring-back process, which charges $C_{R2}$ to the voltage of $C_{C2}$. After the reduction of the resonant current component in $L_{R2}$ by $C_{C2}$, the commutation operation is concluded.

Commutation (c) is carried out with the aid of the decoupling network 2 of the lower bridge half and is initiated by the turn-on of $T_{C2}$ and $T_{R2}$. The commutation sequence and essential current and voltage profiles are illustrated in FIGS. 6a–m.

Figure 6A:
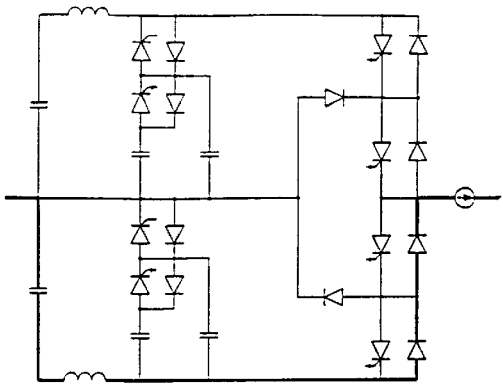
FIGS. 6a–m are circuit diagrams of the commutation from $D_{14}$ and $D_{13}$ to $D_{15}$ and $T_{12}$.
Figure 6B:
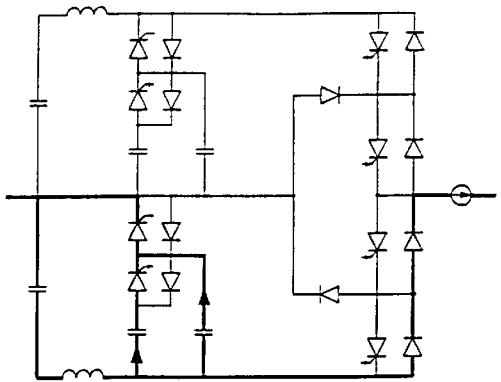
Figure 6C:
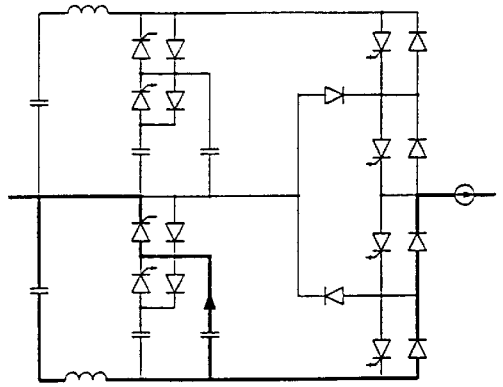
Figure 6D:
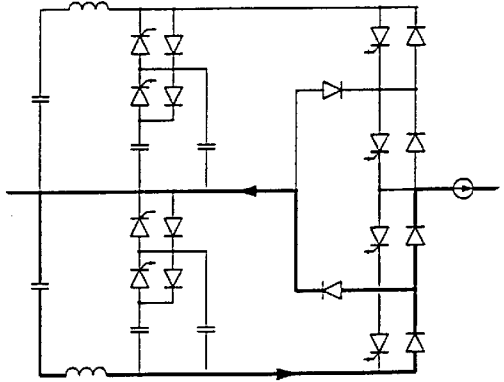
Figure 6E:
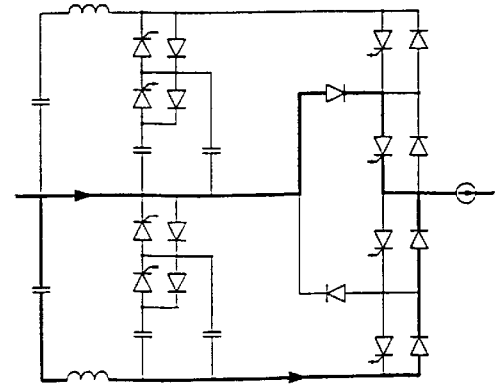
Figure 6F:
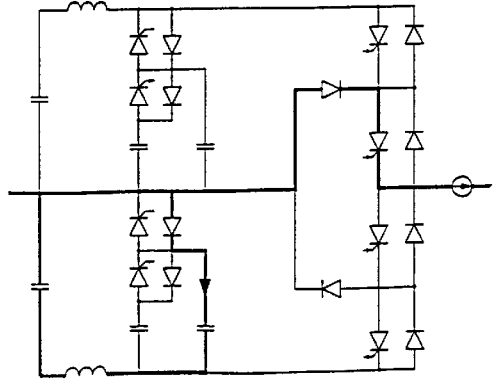
Figure 6G:
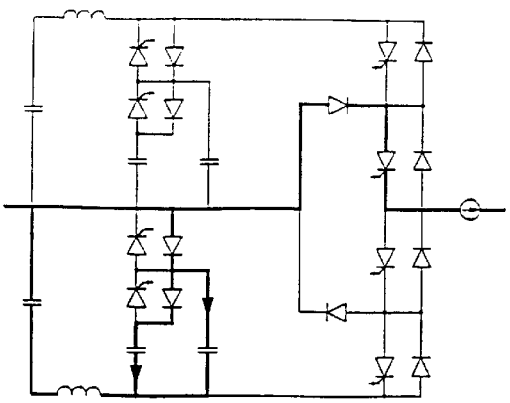
Figure 6H:
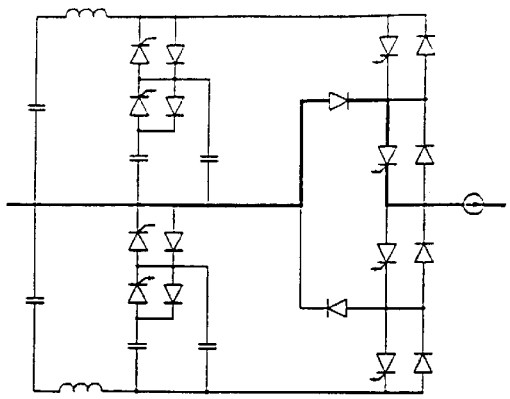
Figure 6I:
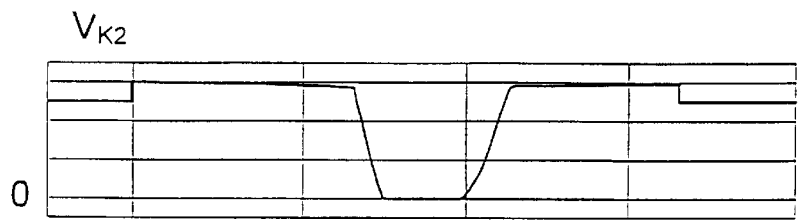
Figure 6J:
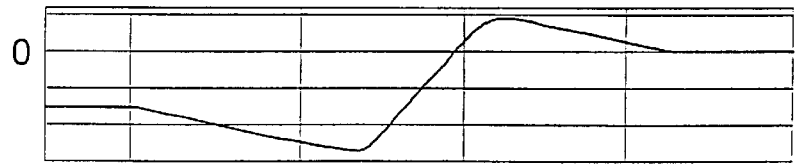
Figure 6K:
Figure 6L:
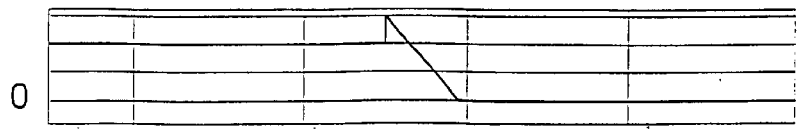
Figure 6M:

In detail, the following are applicable:

FIG. 6a: Before the commutation,

FIG. 6b: Charging of the resonant inductor $L_{R2}$,

FIG. 6c: Resonant discharge process of $C_{R2}$,

FIG. 6d: Reduction of the resonant current via the NPC diode (turn-on of $T_{12}$), FIG. 6e: Commutation of the load current, FIG. 6f: Resonant charging process of $C_{R2}$, FIG. 6g: Discharge of the resonant inductor, FIG. 6h: After commutation has concluded, FIG. 6i: Voltage profile of $V_{k2}$, FIG. 6j: Current profile of $I_{LR2}$, FIG. 6k: Current profile of $I_{D16}$, FIG. 6l: Current profile of $I_{D14}$, and FIG. 6m: Current profile of $I_{D15}$ and $I_{T12}$.

Once again the inductor $L_{R2}$ is charged virtually linearly. The resonant process begins after the turn-off of $T_{C2}$, during which resonant process the voltage across $C_{R2}$ oscillates towards zero. Once the zero voltage has been reached, the resonant current commutates from $C_{R2}$ and $T_{R2}$ to $D_{14}$ and $D_{16}$ and is linearly reduced. $T_{12}$ can now be turned on in a low-loss manner. After the complete reduction of the resonant current through $D_{16}$, the load current commutates, limited through $L_{R2}$, from $D_{14}$ and $D_{13}$ to $D_{15}$ and $T_{12}$. Afterwards, $C_{R2}$ is charged to the voltage of $C_{C2}$ in a resonant process with $L_{R2}$ and then the current through $L_{R2}$ is reduced down to zero.

Figure 7A:
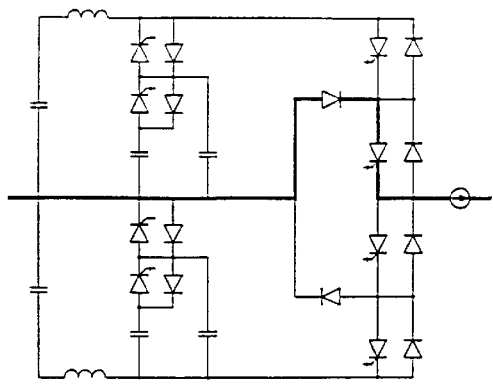
FIGS. 7a–m are circuit diagrams of the commutation from $D_{15}$ to $T_{11}$.
Figure 7B:
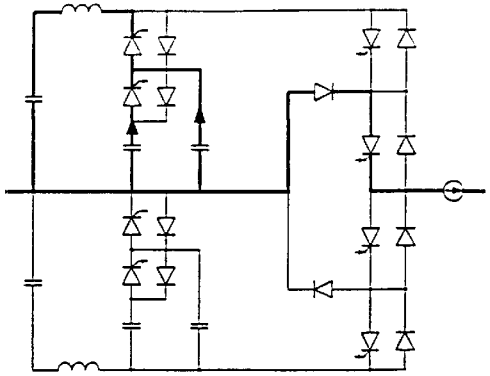
Figure 7C:
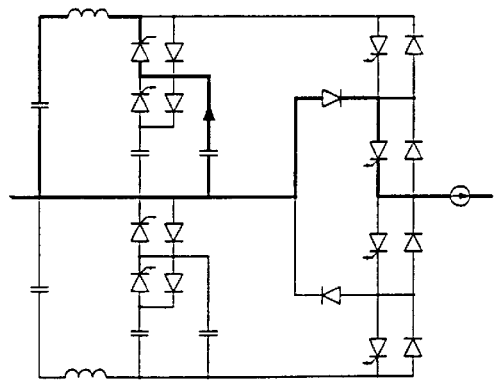
Figure 7D:
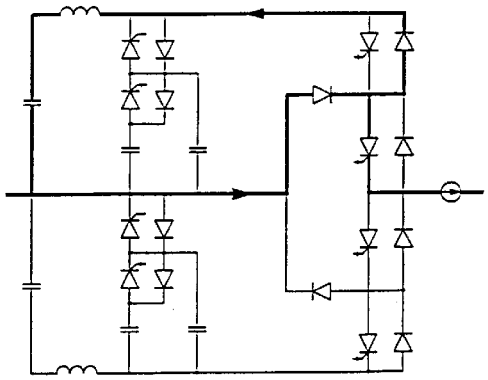
Figure 7E:
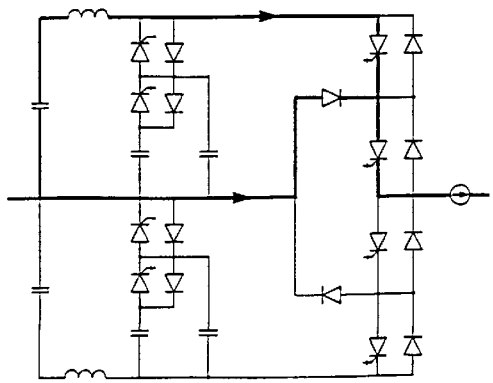
Figure 7F:
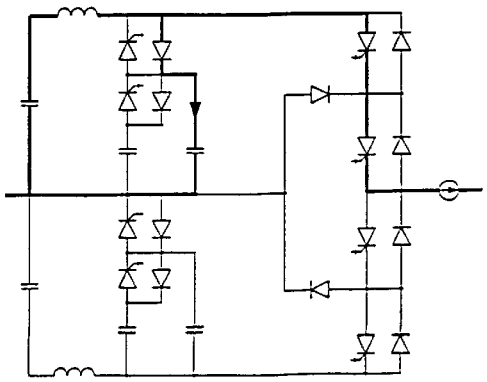
Figure 7G:
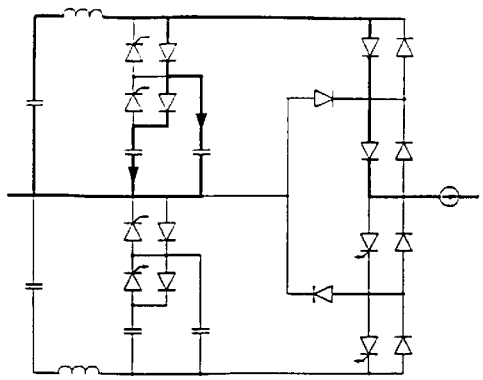
Figure 7H:
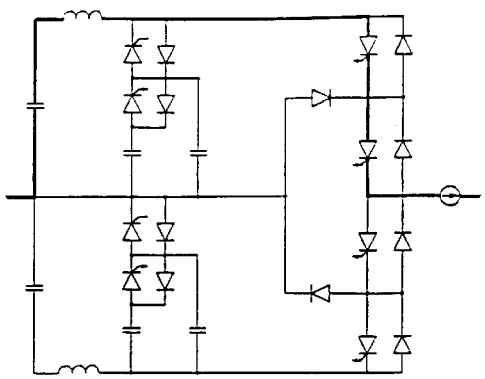
Figure 7I:
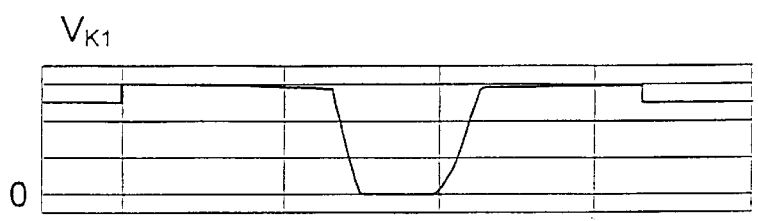
Figure 7J:
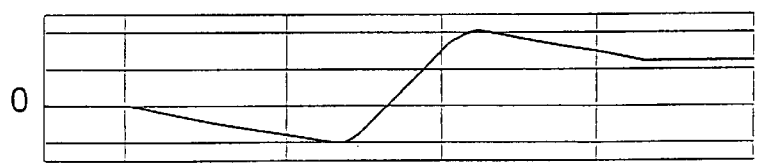
Figure 7K:
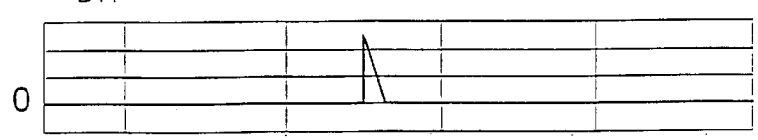
Figure 7L:
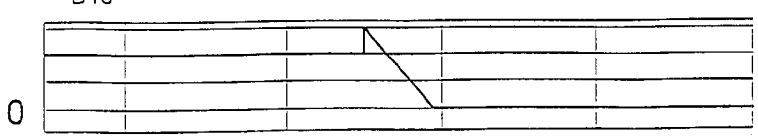
Figure 7M:
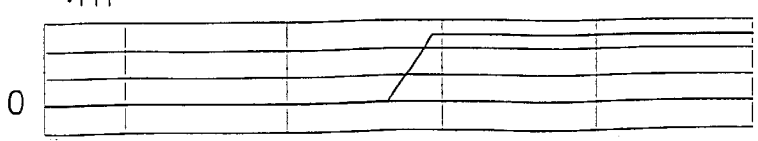

The sequence of commutation (d), which is carried out with the aid of the decoupling network 1 of the upper bridge half, and essential current and voltage profiles are illustrated in FIGS. 7a–m. In detail, the following are applicable:

FIG. 7a: Before the commutation,

FIG. 7b: Charging of the resonant inductor $L_{R1}$,

FIG. 7c: Resonant discharge process of $C_{R1}$,

FIG. 7d: Linear reduction of the resonant current via the NPC diode (turn-on of $T_{11}$), FIG. 7e: Commutation of the load current, FIG. 7f: Resonant charging process of $C_{R1}$, FIG. 7g: Discharge of the resonant inductor, FIG. 7h: After commutation has concluded, FIG. 7i: Voltage profile of $V_{k1}$, FIG. 7j: Current profile of $I_{LR1}$, FIG. 7k: Current profile of $I_{D11}$, FIG. 7l: Current profile of $I_{D15}$, and FIG. 7m: Current profile of $I_{T11}$.

To start the commutation operation, once again the switches of the upper bridge half $T_{C1}$ and $T_{R1}$ are turned on, $L_{R1}$ is charged and, after the turn-off of $T_{C1}$, $C_{R1}$ is discharged in an oscillation process down to the zero voltage. The resonant current then commutates from $C_{R1}$ and $T_{R1}$ to $D_{15}$ and $D_{11}$ and is linearly reduced. During the conduction of $D_{11}$, $T_{11}$ can be turned on in a low-loss manner, whereupon, with the current zero crossing in $L_{R1}$, the load current, limited through $L_{R1}$, commutates from $D_{15}$ to $T_{11}$. After the commutation of the load current has concluded, $C_{R1}$ is charged to the voltage of $C_{C1}$ again by a ring-back process and, finally, the resonant current component in $L_{R1}$ is reduced by $C_{C1}$.

As a result of the overlap of commutation operations (a) and (b), and also (c) and (d), it is also possible to realize low-loss commutations directly from the upper to the lower bridge path, both of the decoupling networks 1, 2 being used for this purpose.

Figure 8A:
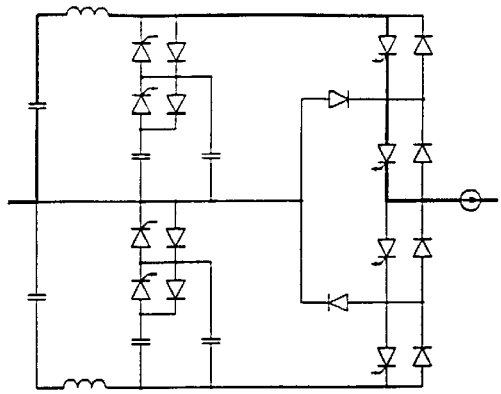
FIGS. 8a–k are circuit diagrams of the commutation from $T_{11}$ and $T_{12}$ to $D_{14}$ and $D_{13}$.
Figure 8B:
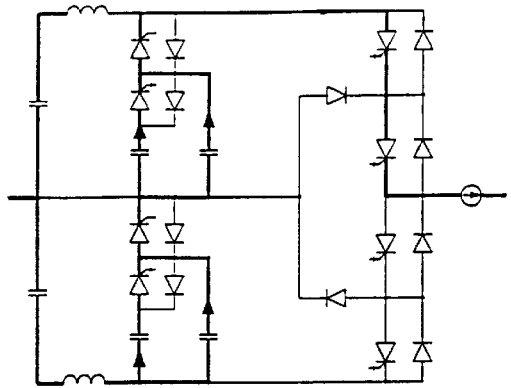
Figure 8C:
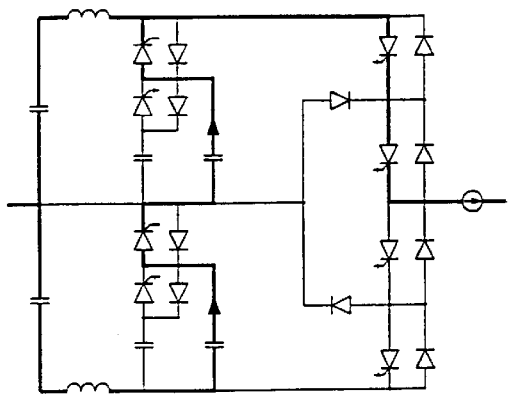
Figure 8D:
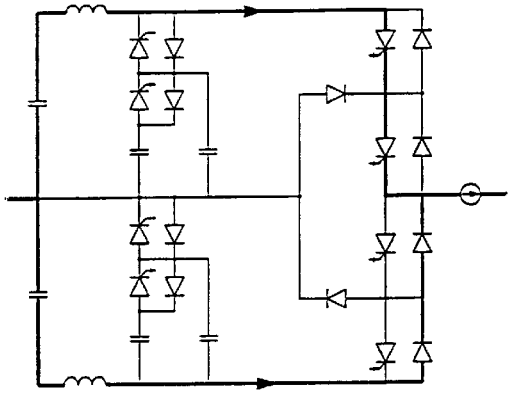
Figure 8E:
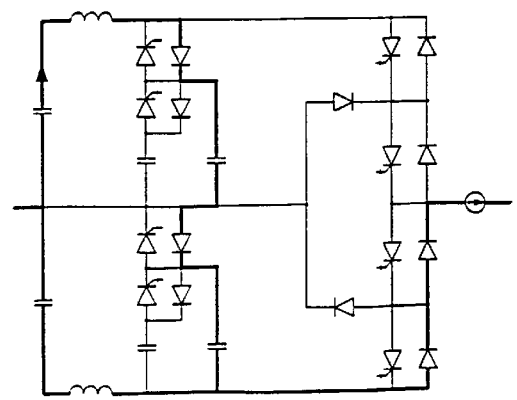
Figure 8F:
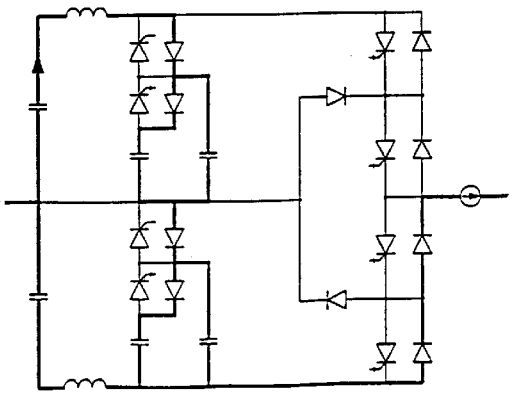
Figure 8G:
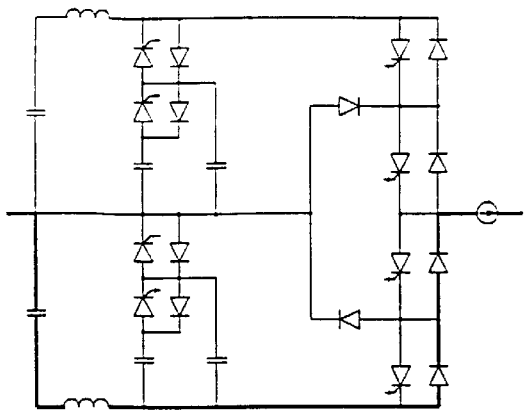
Figure 8H:
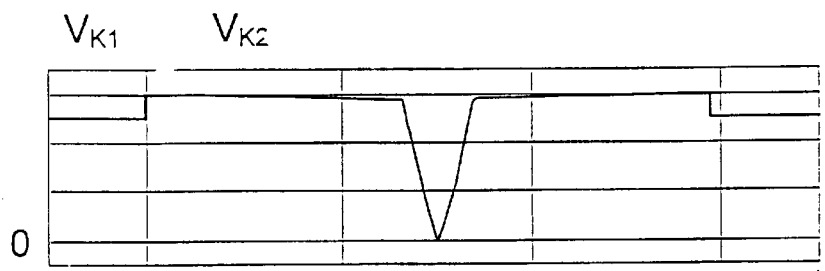
Figure 8I:
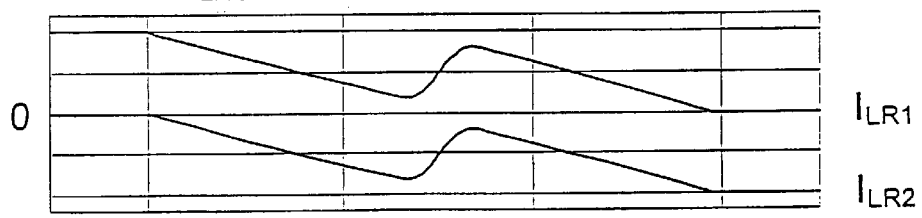
Figure 8J:
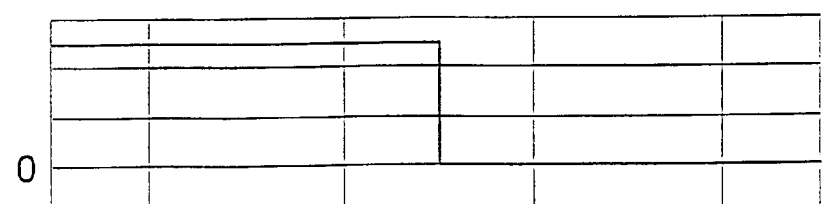
Figure 8K:
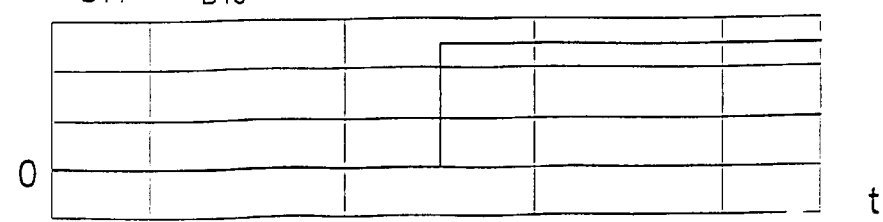

The sequence of the commutation from $T_{11}$ and $T_{12}$ to $D_{14}$ and $D_{13}$ and essential current and voltage profiles are illustrated in FIGS. 8a–k. In detail, the following are applicable:

FIG. 8a: Before the commutation,

FIG. 8b: Charging of the resonant inductors,

FIG. 8c: Resonant discharge process of $C_{R1}$ and $C_{R2}$,

FIG. 8d: Linear reduction of the resonant current before the turn-off of $T_{11}$ and $T_{12}$, FIG. 8e: Resonant charging process of $C_{R1}$ and $C_{R2}$, FIG. 8f: Discharge of the resonant inductors, FIG. 8g: After commutation has concluded, FIG. 8h: Voltage profile of $V_{k1}$ and $V_{k2}$, FIG. 8i: Current profile of $I_{LR1}$ and $I_{LR2}$, FIG. 8j: Current profile of $I_{T11}$ and $I_{T12}$, and FIG. 8k: Current profile of $I_{D14}$ and $I_{D13}$.

The charging process of the resonant inductors $L_{R1}$ and $L_{R2}$ as well as the subsequent oscillation process proceed synchronously, with the result that the voltages $V_{k1}$ and $V_{k2}$ reach zero at the same instant. The resonant current thereupon commutates to the path $D_{14}$, $D_{13}$, $T_{12}$ and $T_{11}$, if appropriate also to $D_{16}$ and $D_{15}$. $T_{11}$ and $T_{12}$ are now turned off in a low-loss manner and the load current commutates virtually instantaneously to $D_{13}$ and $D_{14}$. At the same instant, the current $I_{LR1}$ commutates to $D_{R1}$ and $C_{R1}$ and the difference formed from the load current and the current $I_{LR2}$ commutates to $D_{R2}$ and $C_{R2}$. The ring-back process thereby initiated and the discharge of $L_{R1}$ and $L_{R2}$ conclude the commutation operation.

Figure 9A:
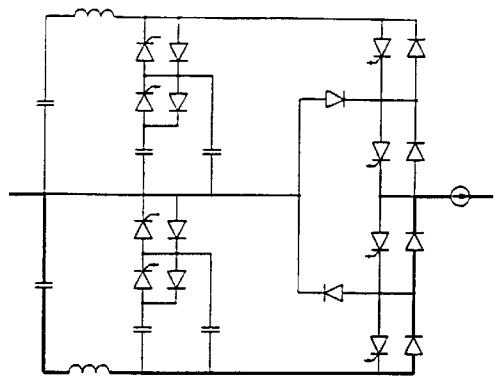
FIGS. 9a–m are circuit diagrams of the commutation from $D_{14}$ and $D_{13}$ to $T_{11}$ and $T_{12}$.
Figure 9B:
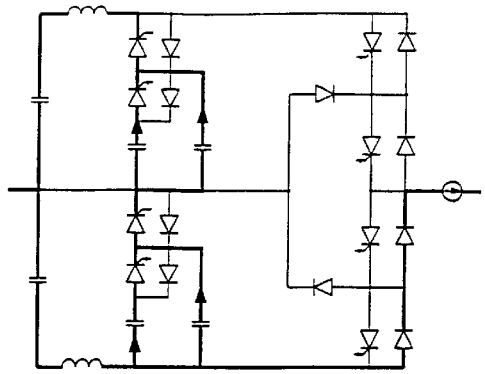
Figure 9C:
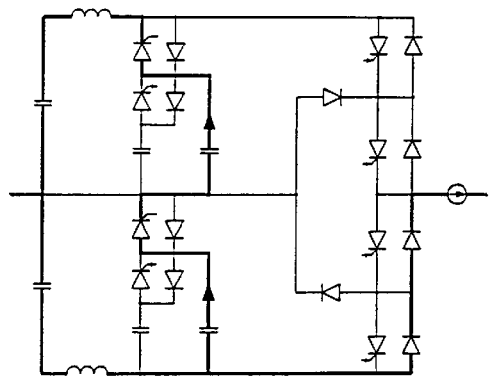
Figure 9D:
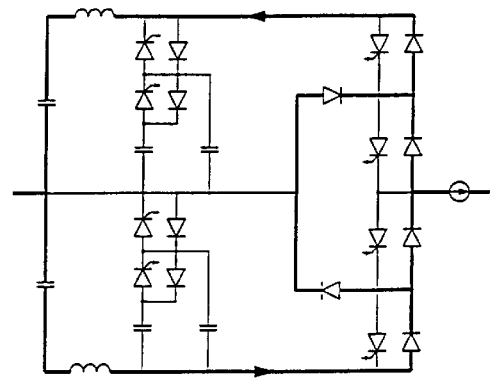
Figure 9E:
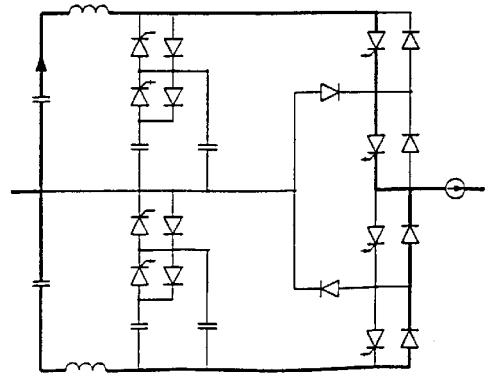
Figure 9F:
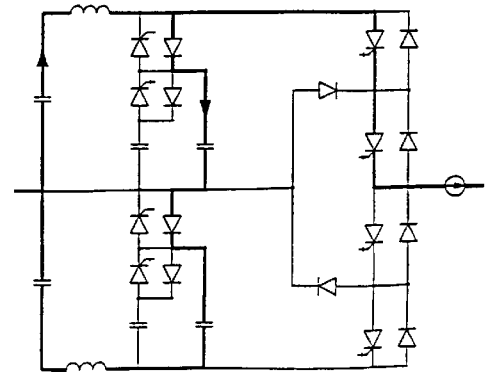
Figure 9G:
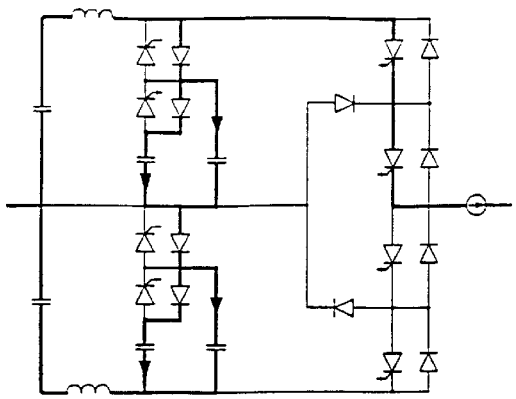
Figure 9H:
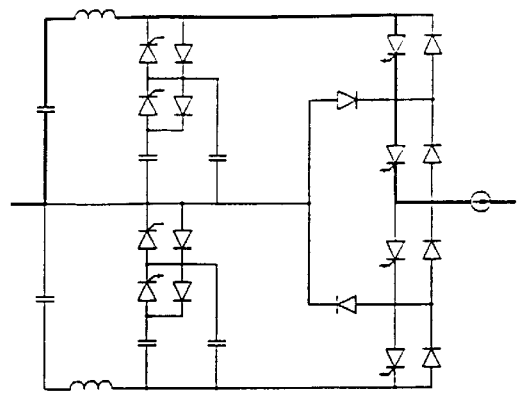
Figure 9I:
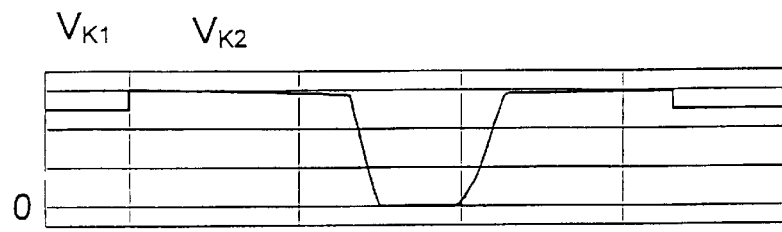
Figure 9J:
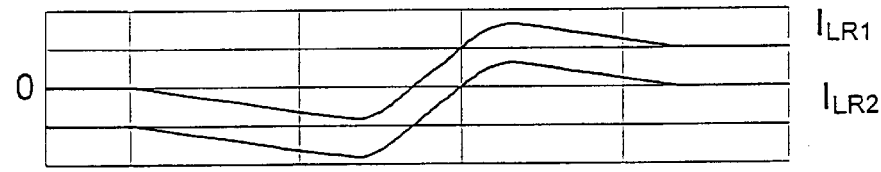
Figure 9K:
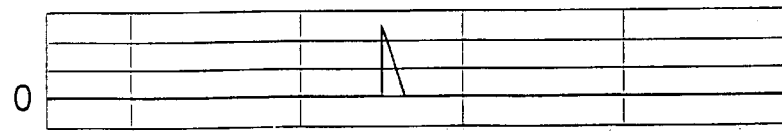
Figure 9L:
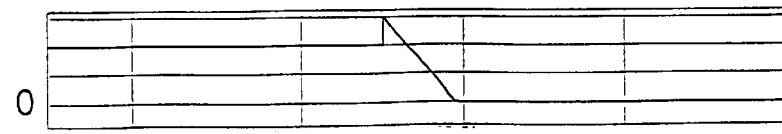
Figure 9M:

The commutation from $D_{14}$ and $D_{13}$ to $T_{11}$ and $T_{12}$ is illustrated in FIGS. 9a–m. In detail, the following are applicable:

FIG. 9a: Before the commutation,

FIG. 9b: Charging of the resonant inductors,

FIG. 9c: Resonant discharge process of $C_{R1}$ and $C_{R2}$,

FIG. 9d: Linear reduction of the resonant current (turn-on of $T_{11}$ and $T_{12}$), FIG. 9e: Commutation of the load current, FIG. 9f: Resonant charging process of $C_{R1}$ and $C_{R2}$, FIG. 9g: Discharge of the resonant inductors, FIG. 9h: After commutation has concluded, FIG. 9i: Voltage profile of $V_{k1}$ and $V_{k2}$, FIG. 9j: Current profile of $I_{LR1}$ and $I_{LR2}$, FIG. 9k: Current profile of $I_{D11}$, FIG. 9l: Current profile of $I_{D14}$, and FIG. 9m: Current profile of $I_{T11}$ and $I_{T12}$.

The commutation begins with the simultaneous charging of $L_{R1}$ and $L_{R2}$ and the simultaneous resonant discharge of $C_{R1}$ and $C_{R2}$. Once the zero voltage has been reached, the resonant current commutates to the path $D_{14}$, $D_{13}$ and $D_{12}$ in parallel with $D_{16}$ and $D_{15}$, and also $D_{11}$, and is linearly reduced. $T_{11}$ and $T_{12}$ can now be turned on in a low-loss manner, with the result that after the current zero crossing in $L_{R1}$, the load current, limited through $L_{R1}$ and $L_{R2}$, can commutate from $D_{14}$ and $D_{13}$ to $T_{11}$ and $T_{12}$. Subsequently, as a result of the simultaneous ring-back process, $C_{R1}$ and $C_{R2}$ are charged to the voltages of $C_{C1}$ and $C_{C2}$, respectively, and the resonant current in $L_{R1}$ and $L_{R2}$ is thereupon linearly reduced. The commutation operation is thus ended.

The commutations can generally be differentiated, depending on the power gradient of the instantaneous power of the converter phase, into a commutation with a positive power gradient and a commutation with a negative power gradient.

In the case of commutations with a positive power gradient, the instantaneous power of the converter output phase after the commutation is greater than before the commutation. In the case of commutations with a negative power gradient, the instantaneous power after the commutation is less than before the commutation. The commutation operations are shorter than the commutations with a positive power gradient. In the case of commutations with a negative power gradient, an active component (GTO, IGCT or IGBT) turns the phase current off. Consequently, the current commutates virtually instantaneously from the component effecting active turn-off to the diode that accepts the current. In this case, the initial condition for the ring-back process is dependent on the level of the load current. In the case of commutations with a positive power gradient, the commutation duration (di/dt) is determined by the intermediate circuit voltage and the resonant inductance. The initial condition for the ring-back process is zero.

During the first phase of all the commutation operations, the charging of $L_{R1}$ and/or $L_{R2}$, energy is released from the charging capacitor $C_{C1}$ and/or $C_{C2}$ to the respective resonant inductor and the intermediate circuit. The voltage across $C_{C1}$ and/or $C_{C2}$ decreases slightly. During the discharge of the resonant inductors until the conclusion of the commutation operations, energy is fed back into $C_{C1}$ and/or $C_{C2}$. In this case, the quantity of energy fed back is dependent on the type of commutation and the magnitude of the load current. In order to keep the voltage across $C_{C1}$ and/or $C_{C2}$ constant at $1.2*V_{dc}/2$, feedback control is used. In the event of an increased voltage, it is possible for additional energy to be released, and the voltage decreased, by a lengthened charging phase of the resonant inductor at the beginning of each commutation.

On the other hand, as a result of an overlap phase during the switching of the main switches, additional energy can be stored in $C_{C1}$ and/or $C_{C2}$ and the voltage can be increased.

Using the example of the commutation operation (a), this means that once the zero voltage across $C_{R1}$ has been reached, $T_{13}$ is immediately turned on but $T_{11}$ is turned off only with a delay. As a result, additional current is built up in $L_{R1}$ and influences the ring-back process in such a way that the charging capacitor $C_{C1}$ stores more energy after the conclusion of the entire oscillation process.

We claim:

1. A three-point converter, comprising:
   an upper bridge half having main switches;
   a lower bridge half having main switches;
   an intermediate circuit having a center tap, a positive pole, a negative pole, and an intermediate circuit voltage;
   upper neutral point clamped diodes (NPC diodes) disposed between and connecting said upper bridge half to said center tap;
   lower NPC diodes disposed between and connecting said lower bridge half to said center tap;
   a first decoupling network connected to said upper bridge half and having terminals, one of said terminals of said first decoupling network connected to said positive pole of said intermediate circuit, another of said terminals of said first decoupling network connected to said upper bridge half, others of said terminals of said first decoupling network connected to said center tap and connected via said upper NPC diodes to said upper bridge half;
   a second decoupling network connected to said lower bridge half and having terminals, one of said terminals of said second decoupling network connected to said negative pole of said intermediate circuit, another of said terminals of said second decoupling network connected to said lower bridge half, and others of said terminals of said second decoupling network connected to said center tap and connected via said lower NPC diodes to said lower upper bridge half; and
   a commutation voltage for said main switches of said upper bridge half and said main switches of said lower bridge half being decoupled from a halved said intermediate circuit voltage independently of one another by said first decoupling network and said second decoupling network.

2. The three-point converter according to claim 1, wherein said first decoupling network, includes:
   a resonant inductor disposed between said one of said terminals of said first decoupling network and said another of said terminals of said first decoupling network;
   a first switch having a first terminal and a second terminal, said first terminal of said first switch connected to said another of said terminals of said first decoupling network;
   a first inverse diode having a first terminal and a second terminal, said first terminal of said first inverse diode connected to said another of said terminals of said first decoupling network;
   a second switch having a first terminal and a second terminal, said first terminal of said second switch connected to both of said second terminal of said first inverse diode and said second terminal of said first switch;
   a second inverse diode having a first terminal and a second terminal, said first terminal of said second inverse diode connected to both of said second terminal of said first inverse diode and said second terminal of said first switch;
   a charging capacitor having a first terminal and a second terminal, said first terminal of said charging capacitor connected to both of said second terminal of said second switch and said second terminal of said second inverse diode, said second terminal of said charging capacitor connected to said center tap; and
   a resonant capacitor having a first terminal and a second terminal, said first terminal of said resonant capacitor connected to a common junction point of said first switch, said second switch, said first inverse diode and said second inverse diode, said second terminal of said resonant capacitor connected to said center tap.

3. The three-point converter according to claim 1, wherein said second decoupling network, includes:
   a resonant inductor disposed between said one of said terminals of said second decoupling network and said another of said terminals of said second decoupling network;
   a first switch having a first terminal and a second terminal, said first terminal of said first switch connected to said center tap;
   a first inverse diode having a first terminal and a second terminal, said first terminal of said first inverse diode connected to said center tap;
   a second switch having a first terminal and a second terminal, said first terminal of said second switch connected to both of said second terminal of said first inverse diode and said second terminal of said first switch;
   a second inverse diode having a first terminal and a second terminal, said first terminal of said second inverse diode connected to both of said second terminal of said first inverse diode and said second terminal of said first switch;
   a charging capacitor having a first terminal and a second terminal, said first terminal of said charging capacitor connected to both of said second terminal of said second switch and said second terminal of said second inverse diode, said second terminal of said charging capacitor connected to said another of said terminals of said second decoupling network; and a resonant capacitor having a first terminal and a second terminal, said first terminal of said resonant capacitor connected to a common junction point of said first switch, said second switch, said first inverse diode and said second inverse diode, said second terminal of said resonant capacitor connected to said another of said terminals of said second decoupling network.

4. A method for operating a converter, which comprises:

providing a three-point converter having:
- an upper bridge half having main switches;
- a lower bridge half having main switches;
- an intermediate circuit having a center tap, a positive pole, a negative pole, and an intermediate circuit voltage;
- upper neutral point clamped diodes (NPC diodes) disposed between and connecting said upper bridge half to said center tap;
- lower NPC diodes disposed between and connecting said lower bridge half to said center tap;
- a first decoupling network connected to said upper bridge half and having terminals, one of said terminals of said first decoupling network connected to said positive pole of said intermediate circuit, another of said terminals of said first decoupling network connected to said upper bridge half, others of said terminals of said first decoupling network connected to said center tap and connected via said upper NPC diodes to said upper bridge half;
- a second decoupling network connected to said lower bridge half and having terminals, one of said terminals of said second decoupling network connected to said negative pole of said intermediate circuit, another of said terminals of said second decoupling network connected to said lower bridge half, and others of said terminals of said second decoupling network connected to said center tap and connected via said lower NPC diodes to said lower upper bridge half; and
- a commutation voltage for said main switches of said upper bridge half and said main switches of said lower bridge half being decoupled from a halved said intermediate circuit voltage independently of one another by said first decoupling network and said second decoupling network;

using the first decoupling network and the upper NPC diodes for performing commutations from the upper bridge half to the center tap and back; and using the second decoupling network and the lower NPC diodes for performing commutations from the lower bridge half to the center tap and back.

5. A method for operating a converter, which comprises:

providing a three-point converter having:
- an upper bridge half having main switches;
- a lower bridge half having main switches;
- an intermediate circuit having a center tap, a positive pole, a negative pole, and an intermediate circuit voltage;
- upper neutral point clamped diodes (NPC diodes) disposed between and connecting said upper bridge half to said center tap;
- lower NPC diodes disposed between and connecting said lower bridge half to said center tap;
- a first decoupling network connected to said upper bridge half and having terminals, one of said terminals of said first decoupling network connected to said positive pole of said intermediate circuit, another of said terminals of said first decoupling network connected to said upper bridge half, others of said terminals of said first decoupling network connected to said center tap and connected via said upper NPC diodes to said upper bridge half;
- a second decoupling network connected to said lower bridge half and having terminals, one of said terminals of said second decoupling network connected to said negative pole of said intermediate circuit, another of said terminals of said second decoupling network connected to said lower bridge half, and others of said terminals of said second decoupling network connected to said center tap and connected via said lower NPC diodes to said lower upper bridge half; and
- a commutation voltage for said main switches of said upper bridge half and said main switches of said lower bridge half being decoupled from a halved said intermediate circuit voltage independently of one another by said first decoupling network and said second decoupling network; and performing commutations from the upper bridge half to the lower bridge half and back by jointly using the first decoupling network and the second decoupling network.

* * * * *